United States Patent [19]

Baker

[11] 4,381,550

[45] Apr. 26, 1983

[54] HIGH SPEED DIVIDING CIRCUIT

[75] Inventor: Dan C. Baker, Bountiful, Utah

[73] Assignee: Sperry Corporation, New York, N.Y.

[21] Appl. No.: 201,895

[22] Filed: Oct. 29, 1980

[51] Int. Cl.$^3$ ............................................. G06F 7/52
[52] U.S. Cl. ................................................... 364/766
[58] Field of Search ............................... 364/766, 767

[56] References Cited

U.S. PATENT DOCUMENTS

| | | | |
|---|---|---|---|
| 3,064,896 | 11/1962 | Carroll et al. ...................... | 364/766 |
| 3,492,468 | 1/1970 | Frye .................................... | 364/766 |
| 4,238,833 | 12/1980 | Ghest et al. ......................... | 364/766 |

OTHER PUBLICATIONS

Majithia et al, "A Low-Cost Binary Division Circuit for Digital Instrumentation", *IEEE Trans. on Instrumentation and Measurement*, vol. 1M-23, No. 1, Mar. 1974, pp. 32-35.

Sanyal, "An Algorithm for Nonrestoring Division", *Computer Design*, May 1977, pp. 124-127.

*Primary Examiner*—David H. Malzahn
*Attorney, Agent, or Firm*—John B. Sowell; Kenneth T. Grace; Marshall M. Truex

[57] ABSTRACT

Logic circuit hardware is provided for dividing a binary fraction divisor into a smaller binary fraction dividend to provide a binary fraction quotient.

Initially, the divisor is stored in a storage register with its sign in the highest order bit position and remains unchanged during the division operation. Initially, the dividend is stored in a dividend shift register and is shifted left one bit before being applied to a parallel adder to perform a partial divide operation. A clock signal is provided to time the division operations, wherein, the stored dividend is added to the stored divisor in a parallel binary adder. When the highest order or sign bit of the adder is positive, the sum of the dividend and the divisor are stored in the dividend register and a binary one is stored in a quotient register. When the highest order or sign bit of the adder is negative, the dividend register is shifted left and a binary zero is filled in the quotient register. Control means, including clock means, are connected logically to effect the division operation and data transfer without software implementation.

8 Claims, 5 Drawing Figures

HIGH SPEED DIVIDING CIRCUIT

BACKGROUND OF THE INVENTION

1. Field of the Invention

This invention relates to high speed arithmetic units. More specifically, the apparatus relates to logical hardware arranged to perform a division operation.

2. Description of the Prior Art

Most small electronic computing machines and central processing units presently employ arithmetic units capable of performing division. Even hand held calculators are capable of performing division operations. The simplest form of binary division is performed as a reverse procedure of multiplication. The quotient in binary division is calculated through successive substraction of the divisor from appropriate orders of the dividend. Each time the substraction operation leaves a positive remainder, a binary one is added to the corresponding order of the quotient. Each time a negative remainder would result, a binary zero is added to the corresponding order of the quotient and steps must be taken which will, in effect, nullify the substraction and leave the quotient unchanged. The problem created by the handling of the negative remainder has been treated in several ways, all of which are time consuming and have heretofore created a requirement for extensive complex logic. Recent developments in large scale integrated circuitry have enabled the manufacture of such logic circuits at extremely low cost; however, the use of such logic has increased the time required to produce a quotient.

Several techniques for handling the negative remainder are known, such as adding the divisor back to the remainder each time a negative remainder occurs. Another method for producing the quotient when the remainder becomes negative as a result of substracting the divisor is to shift the divisor to the right and add it to the negative remainder. When the divisor is shifted to the right one bit, it is effectively divided by two. If the remainder changes from negative to positive, the partial quotient bit is a binary one. Each time the divisor is subtracted from the positive remainder and it becomes negative, the partial quotient is a binary zero.

Also, look ahead methods have been suggested, wherein, the divisor is compared with appropriate orders of the dividend (or the remainder) so that subtraction of the divisor will always produce a positive remainder.

All of the aforementioned division methods require software or logic hardware, which executes a decision making function.

Carroll et al., U.S. Pat. No. 3,064,896 for an Asynchronous Division Apparatus, teaches an apparatus capable of performing division operations in a data processing machine at high speeds. The apparatus of this patent employs the principles of nonrestoring binary division, wherein, the quotient is obtained through successive subtractions of the divisor from appropriate orders of the dividend using adder circuitry. When the divisor is positive, it is converted to one's complement form before being added to the positive dividend. Now the number in the divisor register is negative as a result of having been complemented and it must be converted to a two complement form before being added to the positive dividend to assure that the data portion of the number, resulting from the subtraction, is correct whether or not there is an end carry of a one bit into the sign position.

After this double manipulation of the divisor in a high speed serial adder, the number in the divisor register may be added to the dividend number to effect a subtraction iteration. When there is a carry out of a one bit from the sign stage of the accumulator, the difference is positive and a one bit is stored in the least significant digit stage of the quotient register indicative of the most significant bit of the quotient. When the remainder stored in the accumulator is negative, as indicated by a zero in the sign stage, the divisor in the divisor register does not require complementing and these two unaltered values may be added to effect the next subtraction iteration. However, the zero in the sign bit of the accumulator is indicative of a zero quotient bit.

Numerous applications exist where it is desirable to provide for high speed division computations. Heretofore, such apparatus has only been found in high speed data processing machines having complex circuitry. As an example, the accuracy of an antenna position is a function of the smallest increment which may be detected while it is moving. The increment of movement can only be made smaller when the angular positions of rotation are made extremely fast. The calculation of the increment of rotation is made by a division computation, thus, it would be desirable to provide a simple, economical high speed dividing apparatus without the need for software implementation.

Heretofore, high speed apparatus for performing division operations has been complex and as a result, has required more operations than usually performed in a simple binary multiplication operation involving repetitive binary addition.

SUMMARY OF THE INVENTION

It is a principal object of the present invention to provide an improved, high speed apparatus for performing division operations.

It is another principal object of the present invention to provide a simplified logic structure for performing division in the same number of basic steps as in binary multiplication without software implementation.

It is another principal object of the present invention to provide an apparatus for performing a division operation which comprises one parallel adder and three registers logically connected to perform nonrestoring binary division by subtraction of the divisor from various orders of the dividend or from the sum of the dividend and the divisor.

It is another principal object of the present invention to provide a simplified logic structure for performing division in the same number of basic steps as in binary multiplication without the requirement of complementing any of the numbers during the division operation.

It is another object of the present invention to sense the sign of the dividend and the divisor and to place them in a predetermined complementary form before being stored in a storage register prior to the division operation.

It is another object of the present invention to provide means for converting a negative quotient to a positive quotient and storing the quotient in a parallel buffer register.

According to these and other objects of the present invention, there is provided a two's complement adder for first converting the dividend into its proper positive, or negative complementary form and bus means are provided for transferring said dividend to the dividend shift register. Subsequently, the divisor is loaded in the divisor register in its proper negative, or complementary positive, form. Both the dividend register and the divisor register are connected as parallel inputs to a parallel adder provided with means for sensing the highest order or sign bit. The dividend register contents are shifted left and then added to the divisor register contents. If the sum is negative, the dividend is kept in the dividend shift register and the process repeated while storing a zero in the quotient register, which is shifted left with each subsequent division operation. If and when the sum of the divisor and the shifted contents of the dividend register become positive, a one is stored in the quotient register, which is shifted left with each subsequent division operation. The dividend in the dividend shift register is now replaced with the sum of the divisor and the dividend which was stored in the parallel adder. Clock means are provided for performing the partial division operations during each clock time and preparing the dividend shift register for the next division operation.

BRIEF DESCRIPTION OF THE DRAWINGS

FIG. 1 comprising

DESCRIPTION OF THE PREFERRED EMBODIMENT

Figure 1A:
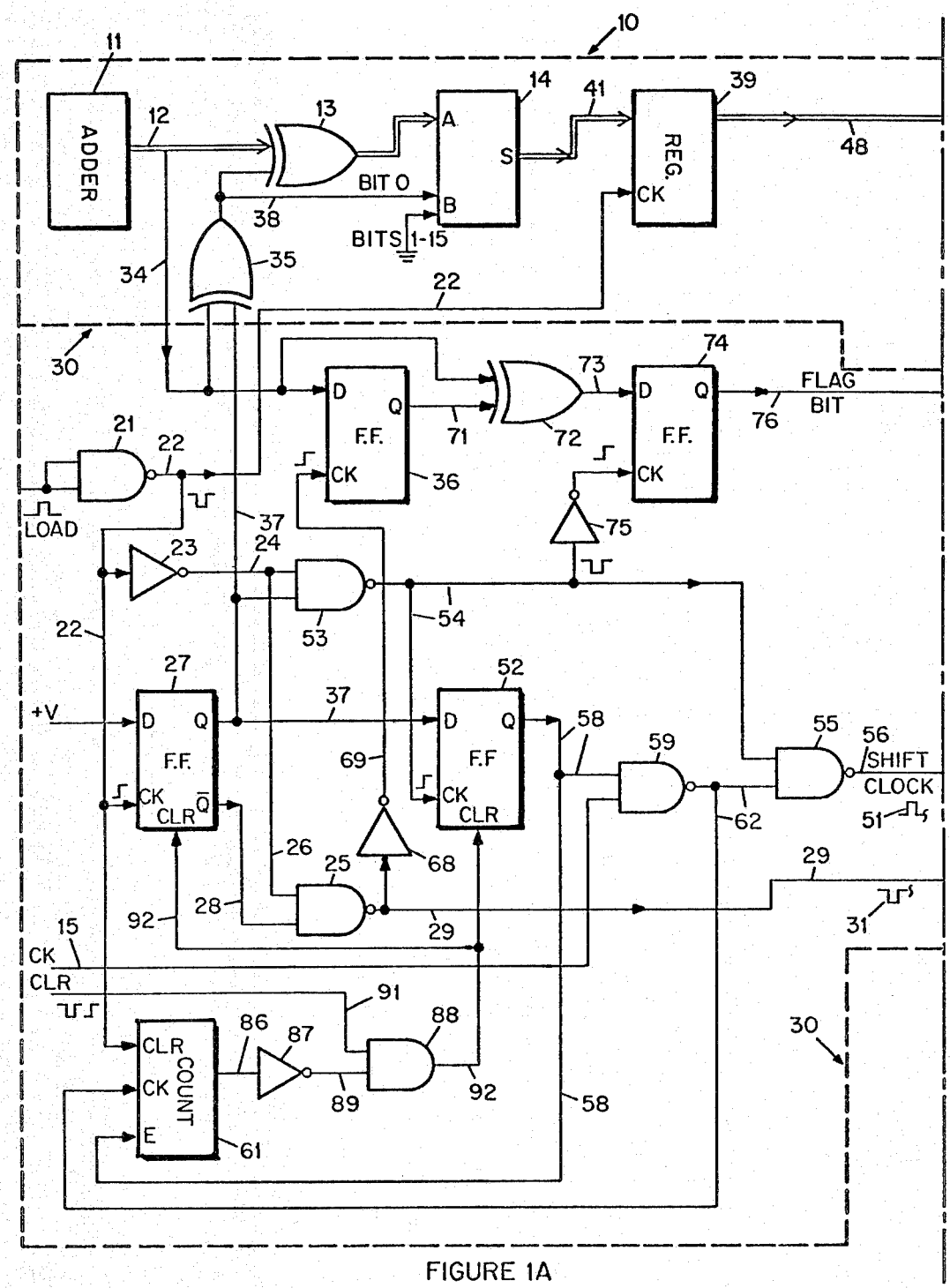
FIGS. 1A and 1B, is a block diagram of a preferred embodiment of the present invention.
Figure 1B:
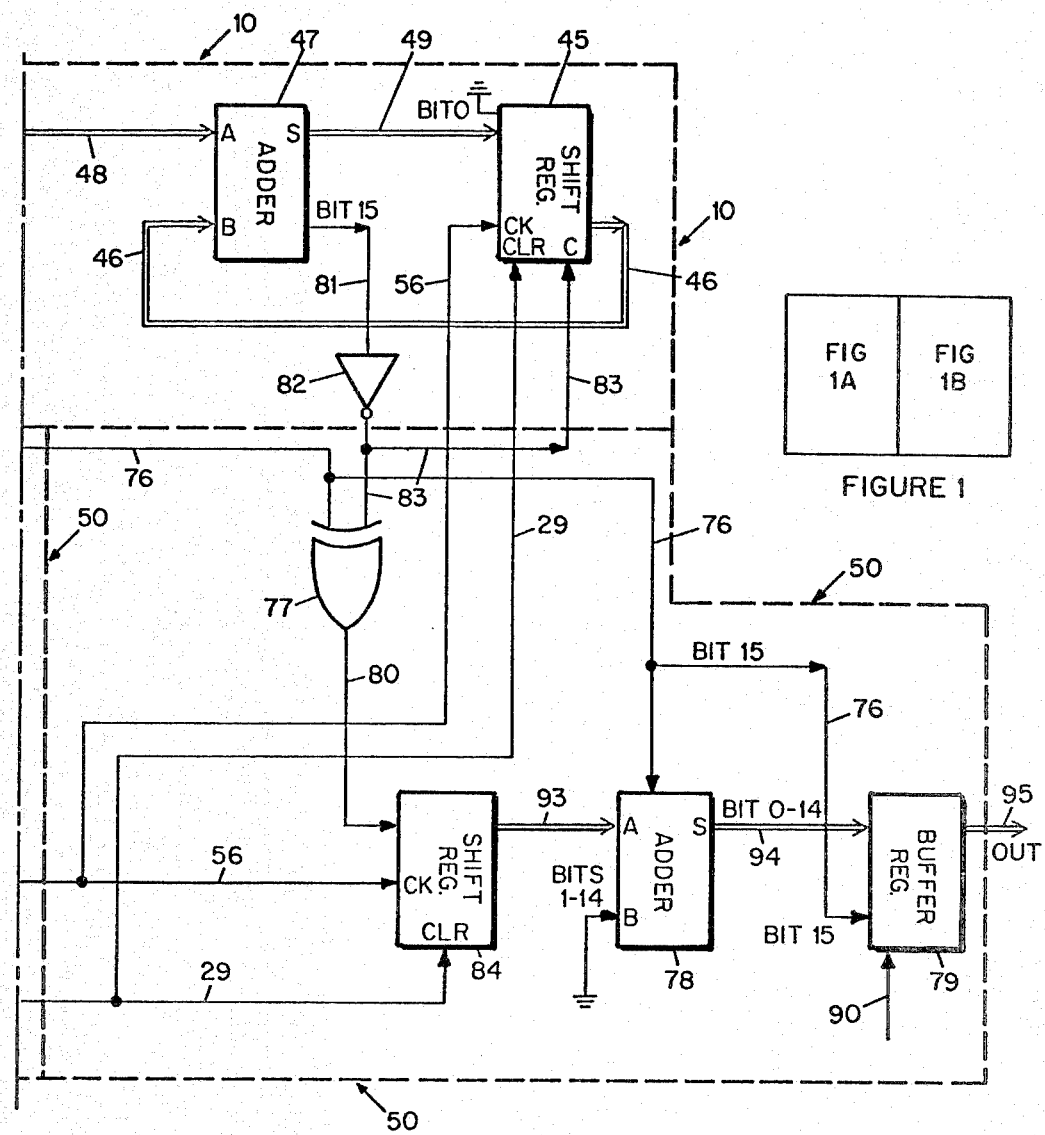

This invention may be best explained with primary reference to FIG. 1, which comprises a block diagram of a preferred embodiment logic circuit for dividing a binary number divisor into a smaller binary dividend to produce a fraction quotient. The logic blocks in the Figures are well known to those skilled in circuit design art and may be implemented with state of the art semiconductor elements such as presently available $T^2L$, $ST^2L$ or ECL logic elements. The sixteen bit divisional operation to be explained hereinafter would ordinarily require up to six hundred instructions if performed by a small general purpose computer. Large computers such as the IBM 3033, which performs up to forty million add operations per second, would still require numerous instructions. Hand held calculators will perform an eight place divisional operation in approximately one second after information is keyed in. The present invention can be employed to produce a sixteen bit quotient in only 1.40 microseconds employing a 12 Megahertz clock.

Figure 2:
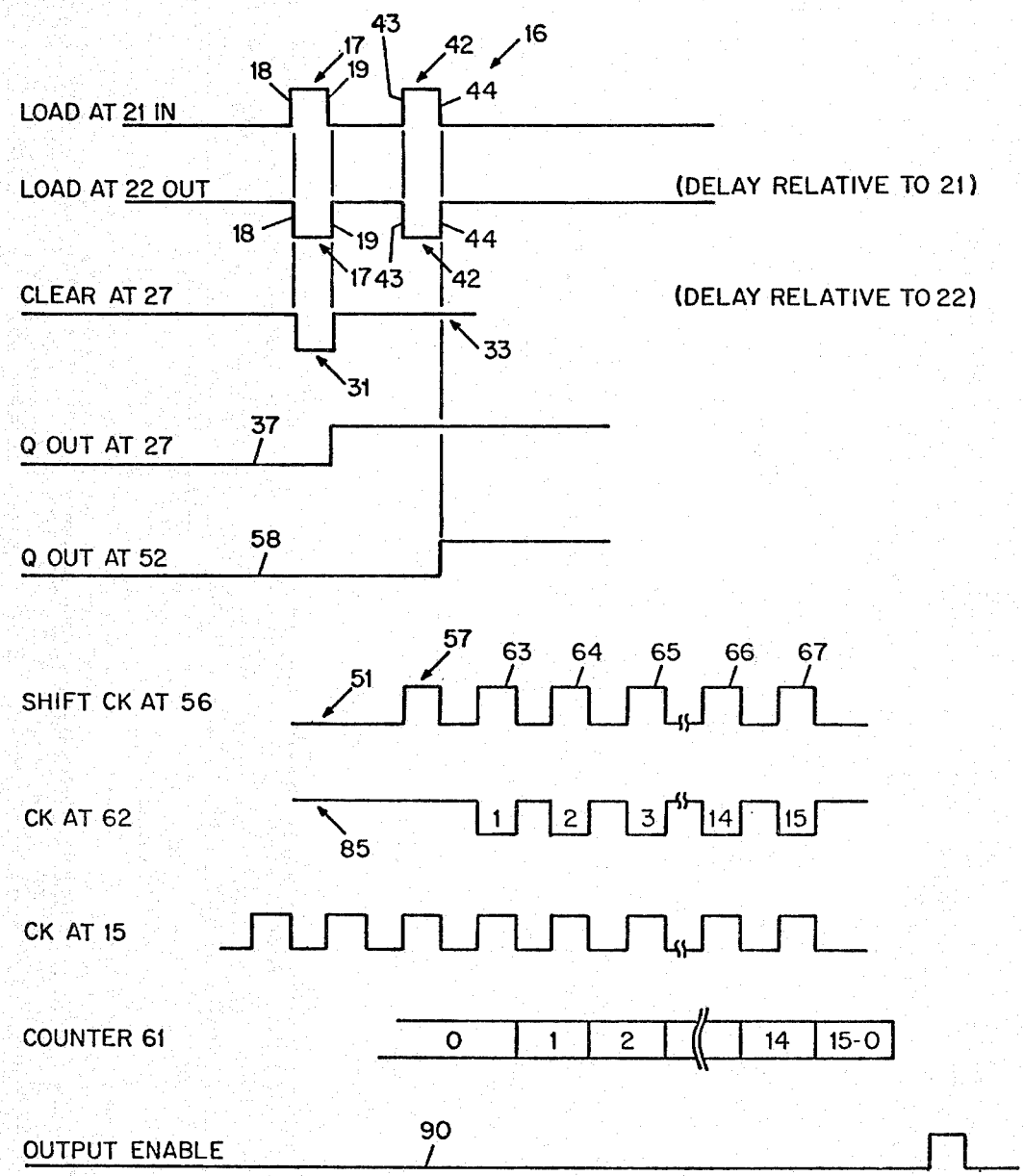
FIG. 2 is a timing diagram showing the clock and control pulses employed in FIGS. 1A and 1B.

FIG. 1 comprises three functional sections, 10, 30 and 50 denoting the divide generation apparatus 10, the timing and control means 30 and the quotient generation means 50. Before a division operation is actually performed, some piece of utilization equipment 11 has generated two binary numbers representative of a divisor and a dividend. These binary numbers are supplied sequentially on data bus 12 to exclusive OR gate 13 and to the A input side of the two's complement adder 14 as will be explained with regards to FIG. 1 and the timing diagram of FIG. 2.

Assume that the power is already on and a new division operation is to be executed. The dividend and the divisor are already loaded in the registers of the utilization equipment 11 as sixteen bit binary digits with the sign bit as the bit 15. Clock signals are being applied at a ten megahertz rate on clock input line 15 when the first load waveform 16 is generated. The load pulse 17 is effective to load the dividend. The load pulse 17 has a leading edge 18 and a trailing edge 19 and is applied to NAND gate 21 to generate a clear pulse. The leading edge 18 of pulse 17 appears on line 22 as a negative going signal and is applied to inverter 23 to produce a delayed replica of pulse 17 on line 24. The delayed pulse 17 is applied to one input of NAND gate 25 via line 26. The inverted load pulse 17 on line 22 is also applied to flip-flop 27 and the trailing edge 19 of pulse 17 appears as a positive going pulse at the clock input of flip-flop 27 and causes the $\bar{Q}$ output on line 28 to switch from positive to negative. The resulting output of NAND gate 25 on line 29 is a delayed inverted replica of pulse 17 and appears as a clear pulse 31 on line 29 as shown on waveform 32. As will be explained, the clear pulse 31 will be employed to clear the dividend shift register and the quotient register.

The trailing edge 19 of pulse 17 is effective to load the dividend. Line 34 connects to the sign bit of data bus 12 and to the input of exclusive OR gate 35 and to dividend sign register 36. The Q output of flip-flop 27 is low until the inverted trailing edge of pulse 17 is applied; therefore, line 37 is low and enables the sign bit on line 34 to appear at the output of exclusive OR gate 35. If the sign is positive, as indicated by a zero bit, the output of exclusive OR gate 35 on line 38 is low and gate 13 is enabled so that the data on bus 12 is presented through the adder 14 and to the divisor register 39. Accordingly, the trailing edge 19 of pulse 17 is active on line 22 and is applied to the clock input of the divisor register 39 to clock the dividend into register 39.

If the sign bit on line 34 is negative, indicative of a one bit, a high signal is present on line 38. The high signal on line 38 is applied to exclusive OR 13 to invert, or form a one's complement of, the data. Also, line 38 is connected to the B side of adder 14 at bit zero to add a one bit, thus, forming a two's complement at the output 41 of the adder 14. Bits one through fifteen on the B side of adder 14 are grounded to prevent inputs to these bits.

The second load pulse 42 on waveform 16 has a leading edge 43 and a trailing edge 44. The second load pulse 42 is effective to load the divisor and transfer the dividend out of the divisor register.

Dividend shift register 45 was previously cleared by the clear pulse 31 on line 29 which is applied to the clear input. Thus, the equivalent of all zeros are present on parallel bus 46 as an output from dividend shift register 45 and as an input to the B side of parallel adder 47. The A input side of parallel adder 47 has present thereon the dividend from bus 48 which presents the contents of the divisor register 39. Thus, the output of adder 47 on bus 49 is the same as the input on bus 48.

The leading edge 43 of the second load pulse 42 is employed to initiate a shift clock waveform 51. The Q output of flip-flop 27 was left in a high state by the first load pulse 17. The high Q output on line 37 is applied to the D side of flip-flop 52 and to one side of NAND gate 53. A delayed inverted pulse 42 is present at the output of gate 53 on line 54. The delayed inverted pulse 42 is applied to one side of NAND gate 55 to generate the first of a series of shift clock pulses shown as waveform 51 appearing on output line 56. Inverted delayed pulse 42 on line 54 is effective to generate pulse 57 of waveform 51 on line 56. The trailing edge of inverted delayed pulse 42 on line 54 is applied to the clock side of flip-flop 52 to cause the Q output of flip-flop 52 to go high following the trailing edge 44 of pulse 42. The Q output of flip-flop 52 on line 58 enables NAND gate 59 and bit counter 61. After gate 59 is enabled, clock pulses on line 15 are applied via line 62 to NAND gate 55 to produce the second and following shift clock pulses 63 to 67 of waveform 51.

As previously explained, the dividend is present in register 39 and on bus 48 and present in adder 47 so as to present the dividend to the dividend shift register 45 on bus 49. When the first shift clock pulse 57 arrives, the dividend is placed in the dividend shift register 45 shifted to the left one position. The shift is preferably made by a hard wired shift parallel input. Accordingly, the zero bit position may be grounded to prevent an input or to present a zero fill.

After the dividend is loaded in register 45, the trailing edge of the second load pulse 42 appears inverted on line 22 and is applied to the clock input of the divisor register 39 to load the divisor in register 39. The sixteen bit divisor is present in a register of the utilization equipment 11 and is processed by exclusive OR gate 13 and adder 14 before being presented to divisor register 39. If the divisor data on bus 12 is negative it remains unchanged, but if the divisor data on bus 12 is positive, it will be changed to a two's complement form. As previously explained, the dividend was complemented if it was negative. The divisor is always presented in a negative form and the dividend is presented in a positive form.

The second load pulse 42 arrives at flip-flop 27 with the Q output high causing exclusive OR gate 35 to invert the sign bit fifteen of the divisor on line 34. If the sign bit is high, indicating that a negative divisor is on bus 12, the sign bit is inverted at exclusive OR gate 35 and no two's complement is taken. If, however, the sign bit on line 34 is positive, it is inverted to a negative condition and a two's complement divisor is loaded into divisor register 39 at the time the trailing edge 44 of the second load pulse 42 is presented on line 22.

Before proceeding with the dividing operation, the signs of the loaded dividend and the divisor are compared to enable the quotient or answer to be produced in an absolute form. The sign bit of the dividend on line 34 is clocked into flip-flop 36 by the leading edge of the clear pulse 31. Pulse 31 on line 29 is inverted by inverter 68 and appears on line 69 at the clock input of flip-flop 36. Thus, the sign bit of the dividend appears at the Q output of flip-flop 36 on line 71 to exclusive OR 72. When the divisor sign bit subsequently appears on line 34, it also appears as an input to exclusive OR 72. If the original signs are the same, there is a low output on line 73, but if the signs are different, there is a high output on line 73 to the data input of flip-flop 74. The delayed inverted pulse 42 on line 54 is inverted by inverter 75 and the delayed positive going leading edge of pulse 42 clocks the compared sign bits on line 73 into flip-flop 74. If the original sign of the dividend and the divisor are the same, there is a zero or low output on line 76 from the Q output of flip-flop 74. Line 76 connects to exclusive OR 77 and the zero bit input of the two's complement adder 78. If the original sign of the dividend and divisor are different a one, or high output, appears on line 76 which will cause the quotient to be converted into a two's complement form.

The dividend shifted one bit to the left is contained in dividend shift register 45 and the divisor is contained in the divisor register 39. The outputs of register 45 on bus 46 are applied to the B input of parallel adder 47. The outputs of register 39 are on bus 48 as the A input to the parallel adder 47. The sum of the two inputs is present in adder 47 and on the output of bus 49.

The most significant bit or sign bit 15 of adder 47 is present separately on line 81. Therefore, if the sum of the dividend and the divisor in adder 47 is positive or zero, a low output is present on line 81 and is inverted in inverter 82 before being applied to exclusive OR gate 77 and to the control input of dividend shift register 45 via line 83.

When a high or positive condition is present on line 83, it is an indication that there is a positive remainder contained in adder 47 and a proper subtraction operation has occurred. However, when a low or negative condition is present on line 83, it is indicating that there is a negative remainder present in adder 47.

If a positive remainder is sensed in adder 47, it is shifted one bit to the left and loaded into dividend shift register 45 by the shift clock signal on line 56. However, if there is a negative remainder sensed in adder 47, the dividend in dividend shift register 45 is merely shifted one bit to the left and applied to the B input of parallel adder 47 for the next division operation.

It will now be understood that the division operation occurs when the two inputs to the adder 47 are added to produce a remainder and a sign bit on line 81 during each clock time.

The first division operation occurs during the first clock time on line 62, shown on waveform 85 as a plurality of division operation counts. The first division operation occurred during the second shift clock pulse 63. As subsequent clock pulses 64 to 67 occur, the division operations are timed by the division operation counts on waveform 85 which are being applied to bit counter 61. Bit counter 61 is set to generate an output on line 86 when the final or fifteenth divisional operation count occurs. The final count on line 86 is inverted by inverter 87 and applied as a low signal to AND gate 88 via line 89. The initializing clear signal on line 91 was low, but is now high enabling AND gate 88. Any low signal applied to AND gate gate 88 produces a low signal on line 92 which clears flip-flops 27 and 52 prior to loading a new dividend and divisor.

As each divisional operation is occurring, the adder 47 is producing a remainder sum which has a positive or a negative sign. The remainder sum sign bit determines whether to load the remainder from the adder 47 into the dividend shift register 45 or to shift the dividend in the dividend shift register 45 one bit to the left. The same sign bit from the adder 47 is the quotient bit which is being produced on line 81 as the output of adder 47 to be stored in the quotient register 84. The same shift clock pulses and clock pulses on line 56 also serially load a quotient bit into the quotient register 84. As the quotient bit on line 83 is loaded via exclusive OR gate 77 and line 80, it is inverted if the flag bit on line 76 was one or high indicating that the sign of the original dividend and divisor were different.

If the flag bit on line 76 is one or high, it produces a one or high bit at the zero bit input of the two's complement adder 78. If the signal on line 76 is high, the quotient bits being stored in quotient register 84 are inverted by exclusive OR gate 77. The inverted quotient bits in quotient register 84 are passed through adder 78 via line 93 and the one in the zero bit of the adder 78 is added to the inverted quotient to produce a two's complement quotient on bus 94 which is applied to buffer register 79. The output of buffer register 79 on bus 95 may be returned to the utilization apparatus 11 or may be supplied to a computer for storage or use. The quotient in shift register 84 does not have a sign bit and the two's complement of the quotient produced on bus 94 does not have a sign bit. The sign being produced by the flag bit on line 76 may be applied to the sign bit position fifteen of the buffer register 79 so that the output quotient on line 95 is an absolute quotient with a sign bit.

Having explained how the quotient may be inverted and complemented, it will be understood that the quotient is being produced at the fifteenth and most significant bit or sign bit of the adder 47. The sign bit on line 81 is inverted in inverter 82 and applied to exclusive OR gate 77 via line 83. When the flag bit is positive or zero, there is no change in the quotient bits being produced on line 80 and they are serially stored in the quotient shift register 84 without modification. The quotient in quotient shift register 84 is passed through adder 78 without modification and appears at buffer register 79 without modification, but here again, the fifteenth or most significant or sign bit is applied to buffer register 79 via line 76 to produce an absolute value plus sign for the quotient on output data bus 95.

Figure 3:
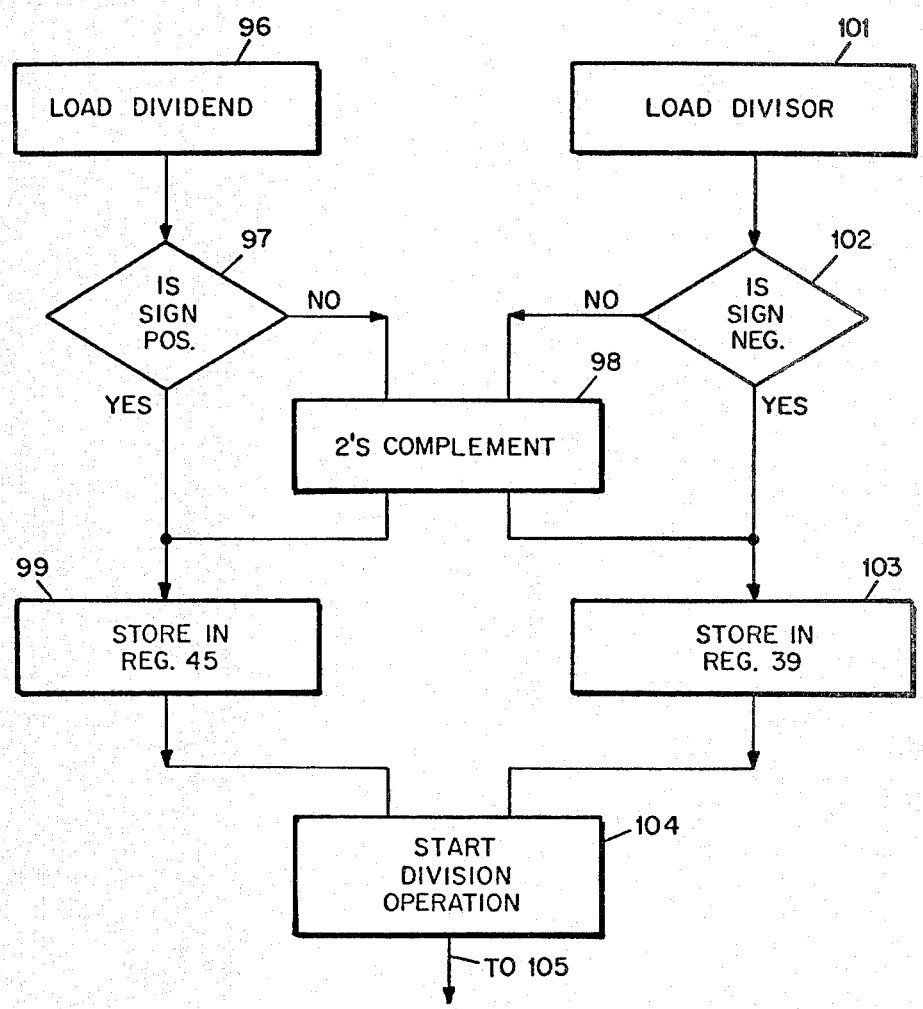
FIG. 3 is a logic flow diagram showing the steps employed in loading the divisor register and the dividend shift register.

Refer now to FIG. 3 showing a logic flow diagram of the steps employed in loading the dividend and the divisor into the divide generation apparatus 10. After the decision to load the dividend and the divisor, the load dividend block 96 causes the dividend to be loaded into the dividend register 45; however, if the sign of the dividend is positive, as noted at block 97, it is stored direct in register 45 as shown at block 99. If the sign is negative, the two's complement of the dividend is taken at block 98 and then stored in register 45. After the dividend is stored in register 45, it is ready for a division operation. The second load pulse causes the divisor to be loaded in the divisor register 39. The load pulse occurs at block 101 and if the sign of the divisor is negative as shown as block 102, it is stored direct in register 39 as shown in block 103, but if the sign of the divisor is positive it is passed through the two's complement block 98 and then stored in the register 39 where it is ready to state a division operation as shown at block 104.

Figure 4:
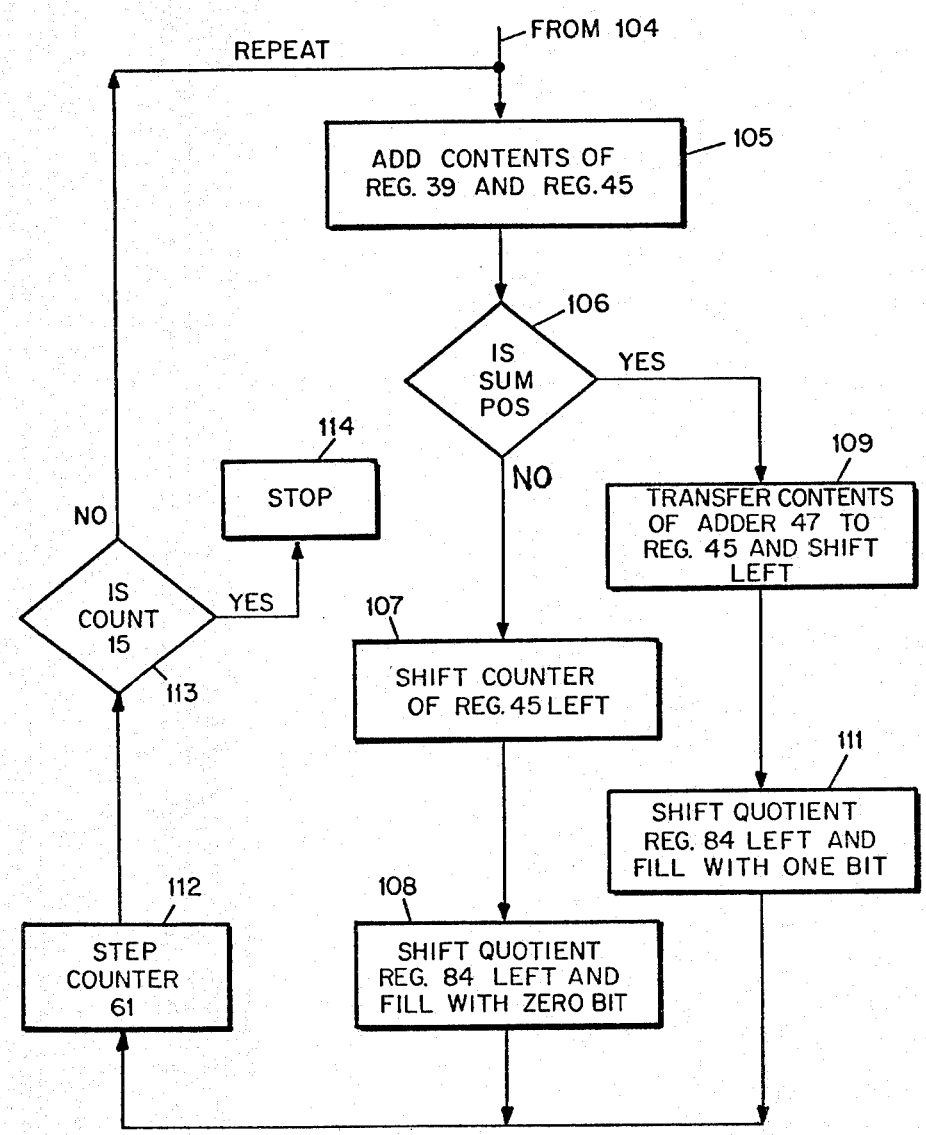
FIG. 4 is a logic flow diagram showing the steps employed in performing a division operation.

Refer now to FIG. 4 showing a logic flow diagram of the steps employed in performing a plurality of division operations. Assuming that a positive dividend and the divisor were processed and stored in registers 45 and 39 respectively, they are added together in adder 47 as shown in block 105. The fifteenth bit or sign of the sum of registers 39 and 45 is examined at block 106 and if negative or one, the contents of register 45 are shifted left one bit as shown in block 107. If the sign is positive or zero, the contents of the adder 47 are shifted left one bit and stored in register 45 as shown in block 109.

When the contents of register 45 are shifted left at block 107, indicating that a negative quotient was present in the adder, the quotient register 84 is shifted left one bit position and the quotient is filled with a zero bit in the least significant bit position as shown in block 108. However, if the sign bit was positive indicating that a negative remainder was in adder 47, the quotient register 84 is shifted left one bit and is filled with a one bit as indicated at block 111. After one branch or the other branch has occurred, the bit counter 61 is stepped one bit as shown at counter 112 and the count is examined to determine if the highest count possible has occurred. In the example already explained, when the count is fifteen as shown at block 113, the division operation has been completed and the operations are stopped as shown in block 114. However, if the count has not reached fifteen, the divisional operation is repeated again as shown at block 105.

In order to more fully explain the operation of the present invention, Table I is provided in which a sixteen place divisor and a sixteen place dividend are shown at each count of the bit counter 61 illustrating the generation of a quotient which is shifted into quotient register 84. In this example, both the dividend and the divisor are positive and no two's complement of the quotient is generated by the flag bit on line 76.

TABLE 1

| COUNT | BIT 15 ... BIT 0 | REG. CONTENTS |
|---|---|---|
|  | 1.001101011100011 | Divisor (IN39) |
|  | 0.010110111000100 | dividend (IN45) |
| 1 | 1.100100010100111 | Sum neg, Q bit=0 |
|  | 1.001101011100011 | Divisor (IN39) |
|  | 0.101101110001000 | dividend (IN45) |
| 2 | 1.111011001101011 | Sum neg, Q bit=0 |
|  | 1.001101011100011 | Divisor (IN39) |
|  | 1.011011100010000 | dividend (IN45) |
| 3 | 0.101000111110011 | Sum pos, Q bit=1 |
|  | 1.001101011100011 | Divisor (IN39) |
|  | 1.010001111100110 | sum (IN45) |
| 4 | 0.011111011001001 | pos sum, Q bit=1 |
|  | 1.001101011100011 | Divisor (IN39) |
|  | 0.111110110010010 | sum (IN45) |
| 5 | 0.001100001110101 | pos sum, Q bit=1 |
|  | 1.001101011100011 | Divisor (IN39) |
|  | 0.011000011101010 | sum (IN45) |
| 6 | 1.100101111001101 | neg sum, Q bit=0 |
|  | 1.001101011100011 | Divisor (IN39) |
|  | 0.110000111010100 | dividend (IN45) |
| 7 | 1.111110010110111 | neg sum, Q bit=0 |
|  | 1.001101011100011 | Divisor (IN39) |
|  | 1.100001110101000 | dividend (IN45) |
| 8 | 0.101111010001011 | pos sum, Q bit=1 |
|  | 1.001101011100011 | Divisor (IN39) |
|  | 1.011110100010110 | sum (IN45) |
| 9 | 0.101011111111001 | pos sum, Q bit=1 |
|  | 1.001101011100011 | Divisor (IN39) |
|  | 1.010111111110010 | sum (IN45) |
| 10 | 0.100101011010101 | pos sum, Q bit=1 |
|  | 1.001101011100011 | Divisor (IN39) |
|  | 1.001010110101010 | sum (IN45) |
| 11 | 0.011000010001101 | pos sum, Q bit=1 |
|  | 1.001101011100011 | Divisor (IN39) |
|  | 0.110000100011010 | sum (IN45) |
| 12 | 1.111101111111101 | neg sum, Q bit=0 |
|  | 1.001101011100011 | Divisor (IN39) |
|  | 1.100001000110100 | dividend (IN45) |
| 13 | 0.101110100010111 | pos sum, Q bit=1 |
|  | 1.001101011100011 | Divisor (IN39) |
|  | 1.011101000101110 | sum (IN45) |
| 14 | 0.101010100010001 | pos sum, Q bit=1 |
|  | 1.001101011100011 | Divisor (IN39) |
|  | 1.010101000100010 | sum (IN45) |
| 15 | 0.100010100000101 | pos sum, Q bit=1 |

A better understanding of Table I is made when examined with reference to the Figures and schematic diagrams of the steps or iterations taking place. For example, at the count of 1, the positive divisor in register 39 is shown to have a one bit in the fifteen bit position. Since the one bit indicates a negative sign, it is now in two's complement form as was explained with reference to FIG. 3. The positive dividend in register 45 has been shifted left one bit and is still positive as indicated by the zero in the fifteenth bit position. A zero bit is filled in at the zero bit position of the dividend as it is shifted left.

At count 1, the sum of the dividend register 45 and divisor register 39 produces a negative sum as indicated by the one in the fifteenth bit position of the sum. The one (1) is present on line 81 and inverted by inverter 82 and appears as a zero bit on line 80 as it is shifted into the lowest order or zero bit position of quotient shift register 84. The quotient register contains fifteen bits (0–14) and no sign bit. At the count of 1 register 84 contains 000 000 000 000 000. Following FIG. 4 and step 1, the sum of the divisor register 39 and dividend register 45 is not positive, thus, a zero is shifted into quotient register 84 and the dividend register 45 is also shifted left in preparation for count 2.

At count 2, the contents of register 39 and 45 are added. The sum is again negative and another zero bit is shifted into quotient register 84. Again, the contents of the dividend register are shifted left and filled with a zero in the lowest order bit in preparation for count 3.

At count 3, the addition of the contents of registers 39 and 45 produce a positive sum in adder 47, therefore, a one bit is shifted into quotient register 84 which now contains 001 in the three lowest order bit positions. Now the sum in the adder 47 is shifted left as it is placed in the dividend register 45 in preparation for count 4.

At counts 4 and 5, the sum remains negative and two more one bits are shifted into the quotient register 84. Again, the sum in the adder is shifted left and placed in the dividend register in preparation for counts 5 and 6.

At count 6, the sum in adder 47 becomes negative again and a zero bit is shifted into quotient register 84. The dividend register 45 is shifted left and filled with a zero in preparation for step 7. Quotient register 84 now contains 001 110 in the six lowest order bit positions.

At step 15, a positive sum is produced in adder 47. The last quotient bit is a one and is shifted into the zero bit position producing the fifteen bit (bits 0–14) quotient in register 84, equal to 001 110 011 110 111 with no sign bit. The positive sum or flag bit on line 76 produces a positive sign at bit 15 of buffer register 79, thus, a zero bit is added at the fifteenth or sign bit position.

On the count of 15 the division operation is completed and the quotient with a sign is in buffer register 79. An output enable signal on line 90 will transfer the contents of register 79 and prepare the system for the next division operation which starts with load pulses 17 and 42 which generate a clear pulse 31 on line 29.

It will be understood that the answer in register 79 may be converted to other convenient forms such as octal and/or decimal values.

Having explained the present invention, it will be understood that minor modifications of the invention may be made within the scope of the present invention which is set forth in the accompanying claims.

I claim:

1. Apparatus for producing a quotient from a binary number dividend and a binary number divisor comprising:

a data bus for sequential transmission of said dividend and said divider as parallel bit numbers, two's complement adder means connected to said data bus and adapted to receive said dividend and said divisor and to sense the sign bit to determine if the dividend and/or the divisor shall be complemented, a parallel dividend shift register coupled to said two's complement adder means for receiving and storing the dividend number from said adder means prior to a division operation, a parallel divisor register coupled to said two's complement adder means for receiving and storing the divisor number from said adder means prior to a division operation, a parallel adder having its inputs connected to the output of the divisor register and the output of said dividend shift register, said parallel adder having a sign position output, the output of said parallel adder being connected to the input of said dividend shift register, control means, coupled to said data bus and including a flag bit comparator for comparing the sign of the dividend and the divisor, quotient shift register means coupled to said control means and coupled to the sign position output of said parallel adder, and said control means being coupled to said adder means, said divisor register and said dividend shift register for producing timing signals for first loading the dividend number and then the divisor number from said adder means into said dividend and said divisor registers and subsequently initiating a dividing operation whereby, the number in said dividend shift register is added to the number in said divisor register and the resulting sign position output is processed and stored in said quotient register means.

2. Apparatus for producing a quotient as set forth in claim 1, wherein said parallel adder input which is connected to the output of said dividend shift register is connected to cause the number from the dividend register to be shifted left one bit before being applied as an input to said parallel adder.

3. Apparatus as set forth in claim 1, wherein said control means is coupled to said dividend shift register and said quotient shift register means and further includes a bit counter for counting the number of dividing operation being performed in said parallel adder and for generating a clear signal at the end of a division operation.

4. Apparatus as set forth in claim 1, wherein said quotient shift register means coupled to said control means further includes means for detecting the difference of the sign bit of the sum of said dividend and said divisor from said parallel adder with the flag bit comparator output, said means for detecting the difference being coupled to the input of said quotient shift register means for converting the quotient output from said parallel adder to a two's complement form when the sign of the sum of the divisor and dividend are different from the flag bit comparator output.

5. Apparatus as set forth in claim 4, wherein said quotient shift register means comprises a serial-in-parallel-out shift register for storing the quotient bits being produced at said parallel adder, and a second parallel adder connected to the output of said quotient shift register for receiving and storing the parallel output from said quotient shift register and for adding a one bit generated by said means for detecting.

6. Apparatus as set forth in claim 1, wherein said two's complement adder means includes gating means for detecting the sign of the dividend on said data bus for forming a two's complement in said two's complement adder when said dividend is negative.

7. Apparatus as set forth in claim 1 wherein said two's complement adder means includes gating means for detecting the sign of the divisor on said data bus for forming a two's complement in said two's complement adder when said divisor is positive.

8. Apparatus as set forth in claim 1, wherein said divisor is a larger number than said dividend so that said quotient is always a fraction number with a sign.

* * * * *